March 7, 1967
H. L. McDERMOTT
3,307,582
PORTING ARRANGEMENT FOR FLUID PRESSURE DEVICE
Filed Jan. 4, 1965
3 Sheets-Sheet 1
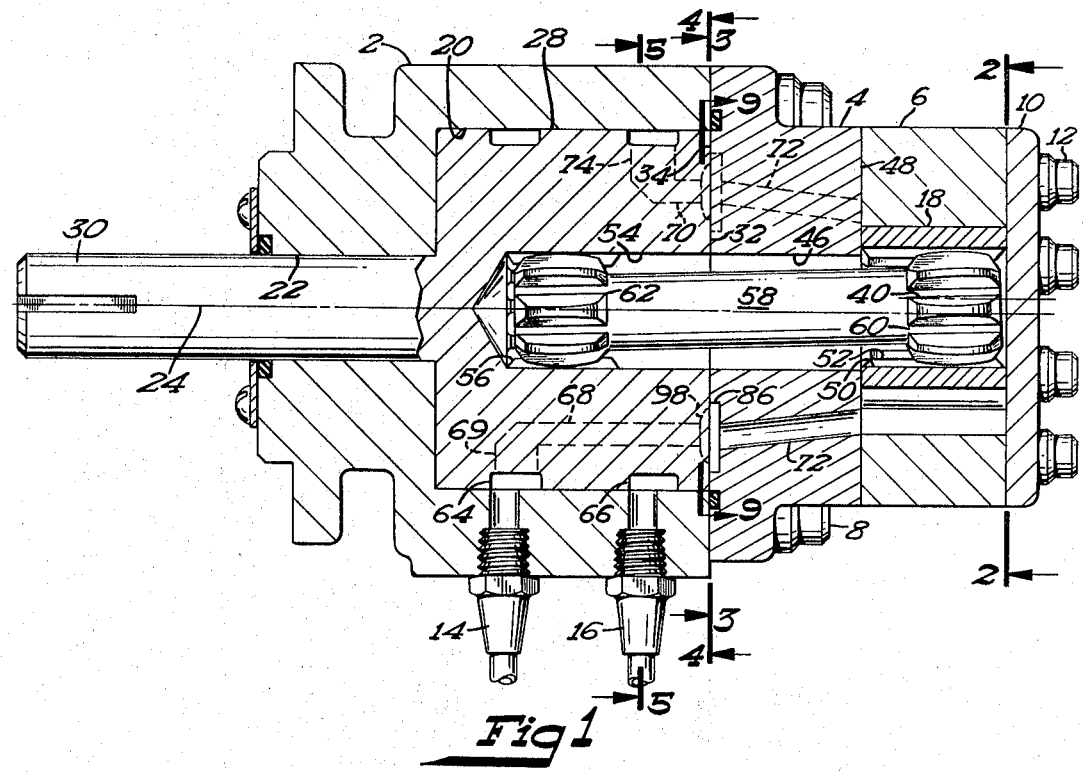
Fig 1
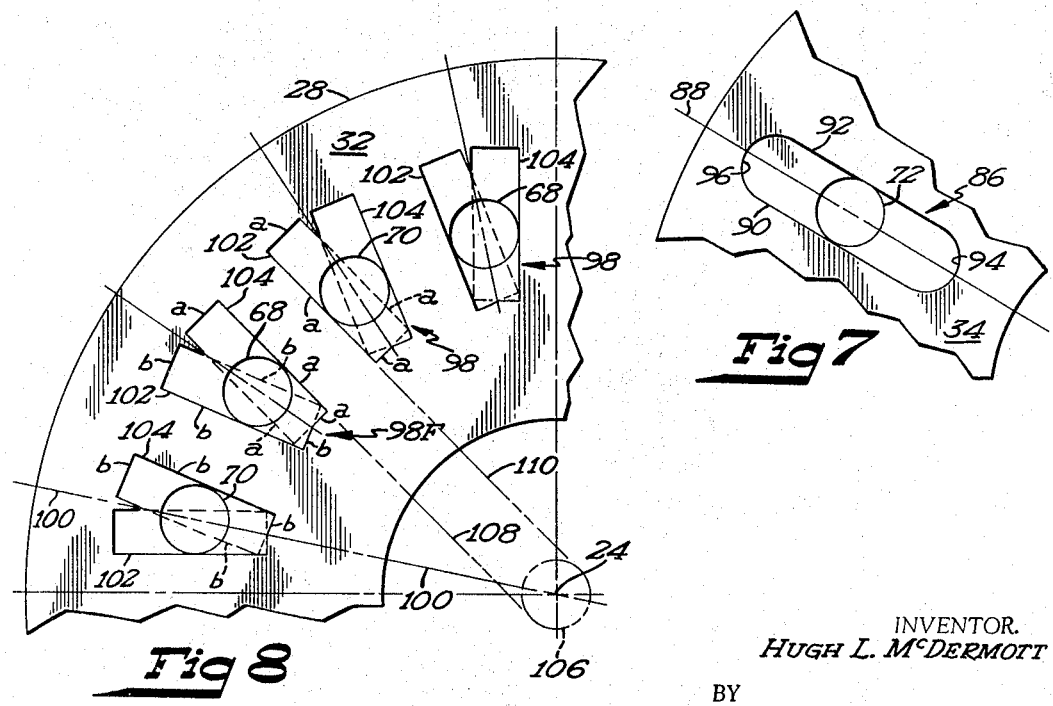
Fig 7
Fig 8
INVENTOR.
HUGH L. McDERMOTT
BY
Wayne B. Easton
ATTORNEY March 7, 1967  H. L. McDERMOTT  3,307,582
PORTING ARRANGEMENT FOR FLUID PRESSURE DEVICE
Filed Jan. 4, 1965  3 Sheets-Sheet 2

INVENTOR.
HUGH L. McDERMOTT
BY
Wayne B. Easton
ATTORNEY

March 7, 1967  H. L. McDERMOTT  3,307,582
PORTING ARRANGEMENT FOR FLUID PRESSURE DEVICE
Filed Jan. 4, 1965  3 Sheets-Sheet 3
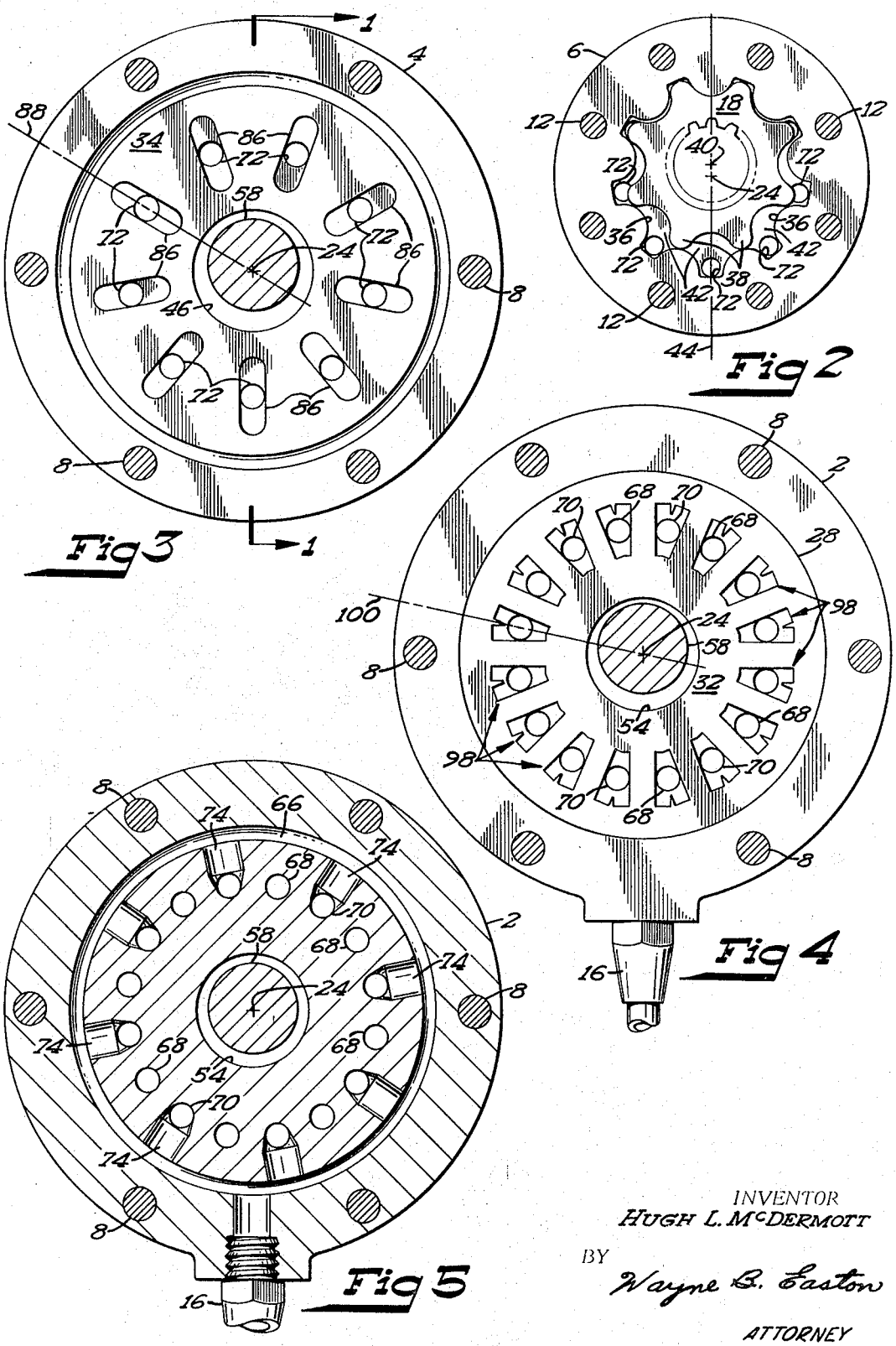
INVENTOR
HUGH L. McDERMOTT
BY
Wayne B. Easton
ATTORNEY

United States Patent Office 3,307,582
Patented Mar. 7, 1967

3,307,582
PORTING ARRANGEMENT FOR FLUID
PRESSURE DEVICE
Hugh L. McDermott, Minneapolis, Minn., assignor to
Char-Lynn Company, Minneapolis, Minn., a corporation of Minnesota
Filed Jan. 4, 1965, Ser. No. 422,925
5 Claims. (Cl. 137—625.11)

This invention relates to fluid pressure devices and more particularly to fluid passage porting arrangements for such devices.

In fluid pressure devices there are passages in relatively moveable parts thereof which are periodically in fluid communication and, when such communication is established, fluid flows from the passage of one part, such as a rotating part, to the passage of another part, such as a stationary part, or vice versa. In flowing from one part to another part, the fluid flows through ports in surfaces which are in sliding and fluid sealing engagements. These surfaces may be either cylindrical or plane surfaces.

The present invention is directed to constructions in which the surfaces referred to above are plane surfaces and in which a part in a moveable part of the device, which periodically moves into fluid communication with a port in a relatively stationary part of the device, moves along a curved path such as a circular path.

A main object of the invention is to provide a fluid pressure device of the type described above having a new and improved arrangement of ports, new and improved shapes for the ports, and a new and improved method for forming the ports.

Other objects and advantages will become apparent from the following specification, appended claims and attached drawing.

In the drawings:

FIG. 1 is a longitudinal sectional view of a fluid pressure motor or pump embodying the invention and taken on line I—I of FIG. 3;

FIG. 2 is a transverse sectional view taken on line II—II of FIG. 1;

FIG. 3 is a transverse sectional view taken on line III—III of FIG. 1;

FIG. 4 is a transverse sectional view taken on line IV—IV of FIG. 1;

FIG. 5 is a transverse sectional view taken on line V—V of FIG. 1;

FIG. 7 is an enlarged fragmentary view of a portion of the sectional view shown in FIG. 3;

FIG. 8 is an enlarged fragmentary view of a portion of the sectional view shown in FIG. 4.

Figure 9:
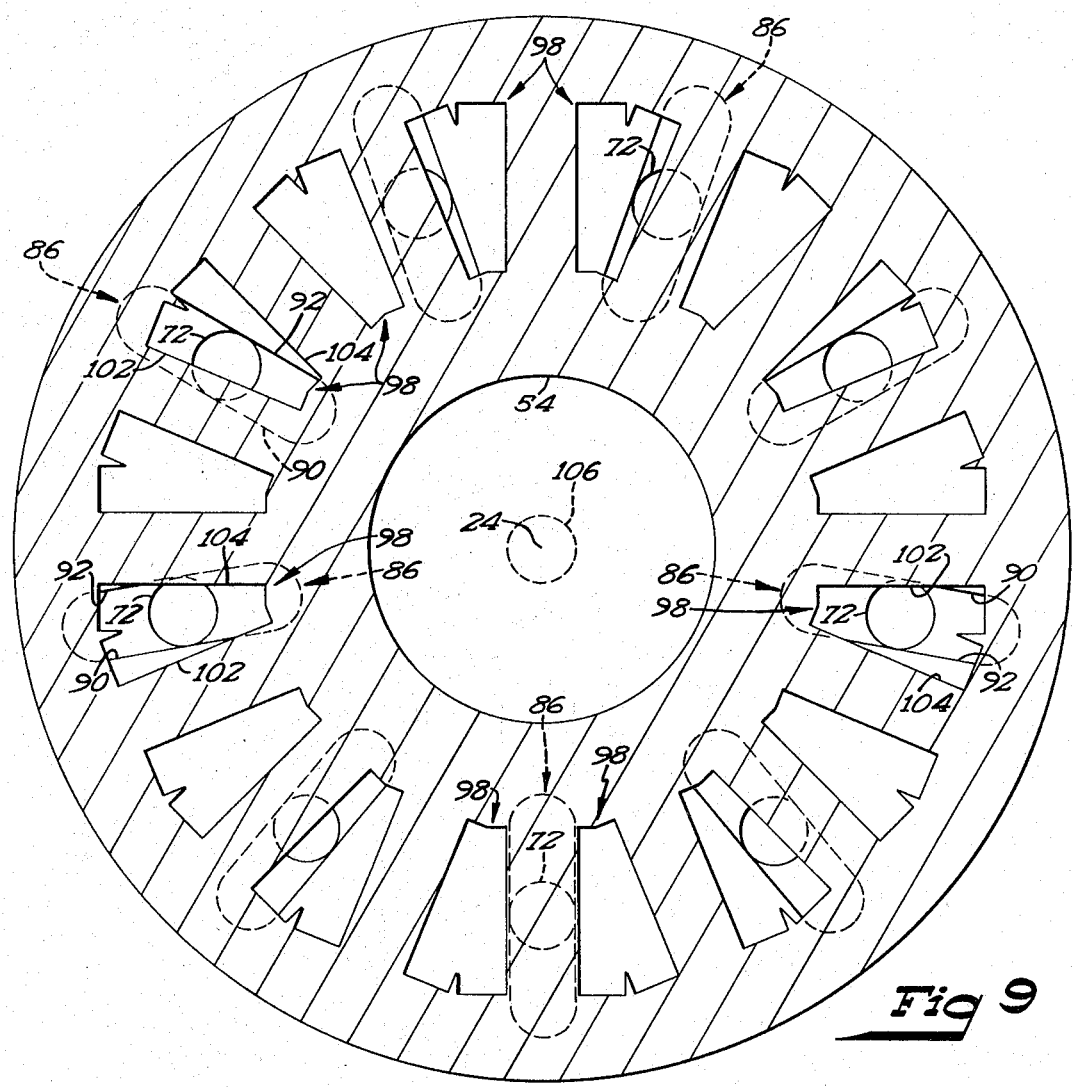
FIG. 9 is a transverse sectional view taken on line IX—IX of FIG. 1 which shows the relationship between the valve ports shown in FIGS. 3 and 4.

In the fluid pressure motor or pump illustrated there is provided a casing or housing made of several sections which are a valve casing section 2, a fluid passage casing section 4 and a Gerotor casing section 6. Casing sections 2 and 4 are held together in axial alignment by a plurality of circumferentially spaced bolts 8. An end cover plate 10 which serves as a side plate for the Gerotor casing section 6 is provided and the casing sections 4 and 6 and cover plate 10 are held together in axial alignment by a plurality of circumferentially spaced bolts 12.

Casing section 2 is provided with inlet and outlet ports 14 and 16 which would be reversed for operation of the pump or motor in the opposite direction.

The shape of Gerotor casing section 6 is generally cylindrical and annular and has a plurality of internal teeth. An externally toothed star member 18 having at least one fewer teeth than casing section 6, which may be referred to as a ring member 6, has the teeth thereof in meshing engagement with the teeth of ring member 6. Star member 18 partakes of a hypocycloidal movement and travels in an orbit about the axis of ring member 6.

The Gerotor mechanism which comprises ring member 6 and star member 18 is disclosed and described more fully in United States Patent No. 1,682,563, issued August 28, 1928, to Myron F. Hill. The Gerotor mechanism may be used as a fluid pressure motor or pump and will be described more fully later on. For the present it will suffice to mention that the present invention is concerned with the valving and fluid passage means whereby fluid is supplied to and exhausted from the Gerotor mechanism when the unit is operated either as a pump or a motor. As far as the scope of the invention is concerned, however, the valving and fluid passage means disclosed herein have general utility and it is only by way of example that the invention is illustrated as being embodied in the pump or motor disclosed herein.

Valve casing section 2 has a generally cylindrical shape and has an axially extending bore 20 and a counterbore 22, both of which bores are concentric relative to the axis 24 of ring member 6. Inlet and outlet ports 14 and 16 communicate with the interior of bore 20 as shown in FIG. 1. Rotatably disposed in valve casing section 2 is a combination valve and shaft member which comprises a cylindrically shaped valve 28 which is rotatably supported in bore 20 and a shaft 30 which is rotatably supported in counterbore 22. Shaft 30 is an input shaft if the device is used as a pump and an output shaft if the device is used as a motor. The axial length of valve portion 28 is equal to the axial length of bore 20 so that the radial surface 32 of valve portion 28 is in slidable engagement with the adjacent radial surface 34 of casing section 4.

With reference to FIG. 2, the gerotor casing section 6, which in effect is the ring member 6, has a plurality of internal teeth 36. Externally toothed star member 18, having at least one fewer tooth 38 than ring members 6, is disposed eccentrically in the chamber or space formed and surrounded by ring member 6. Star member 18 is movable orbitally relative to the ring member 6 with the axis 40 of star member 18 being movable in an orbital path about the axis 24 of ring member 6. During orbital movement of star member 18 the teeth 38 thereof intermesh with the ring member teeth 36 in sealing engagement to form expanding and contracting cells 42 which are equal in number to the number of teeth 38 of star member 18.

With further reference to FIG. 2, a vertical centerline 44 incidentally represents the line of eccentricity for the star member 18 for that particular position of the star member relative to the ring member 6. During orbital movement of the star member 18, and assuming the orbital movement is clockwise, the cells 42 on the right side of the line of eccentricity would be contracting and the cells 42 on the left side would be expanding. If the device is used as a motor, fluid under pressure is directed to the expanding cells and exhausted from the contracting cells. If the device is used as a pump, fluid is sucked into the expanding cells and delivered under pressure from the contracting cells. The valving arrangement which facilitates the pumping or motor action will be described further on herein.

Casing section 4 has a bore 46 which is concentric relative to the axis 24 and is of small enough diameter so that the resulting annular face 48 which abuts gerotor casing section 6, along with cover plate 10, form sides for the gerotor chamber so that the expanding and contracting cells 42 formed between the teeth of the gerotor star and ring members 18 and 6 will be closed for all orbital positions of the star member 18.

Star member 18 has a bore 50 which is concentric relative to the teeth 38 thereof and the bore 50 is provided with a plurality of circumferentially arranged, axially extending teeth or splines 52. A bore 54 of valve 28, which is concentric relative to axis 24 and communicates with the bores 46 and 50 of casing section 4 and star 18, also has a plurality of circumferentially arranged, axially extending teeth or splines 56. A shaft 58, which may be referred to as a dogbone because of its general appearance, extends between and mechanically connects star 18 and valve 28 in driving relation. Heads 60 and 62 at opposite ends of dogbone 58 are frustospherically shaped and are provided with splines which are equal in number to and mesh with splines 52 and 56 of the star and valve members 18 and 28.

Star member 18 is eccentrically disposed relative to ring member 6, as mentioned above, and the dogbone shaft 58 is thus always in a cocked or tilted position relative to valve 28, which has the same axis 24 as ring member 6, and to the axis 40 of star member 18. In operation a star member 18 having six teeth will make one revolution about its own axis 40 for every six times the star member orbits in the opposite direction about the axis 24 of the ring member 6. Thus, the right end of the dogbone 58 has both orbital and rotational movement in common with the star member 18 while the left end of the dogbone has only rotational movement in common with valve 28.

The spline connections between dogbone 58 and valve 28 on the one hand, and between dogbone 58 and star member 18 on the other hand, are forms of universal joints which permit the dogbone to have the motion described above. When the device is utilized as a pump, star member 18 will be gyrated by a turning force applied to shaft 30 which is transmitted to star member 18 through the dogbone 58. When the device is used as a motor, the force created by the rotation of star member 18 about its own axis 40 will be transmitted through dogbone 58 to shaft 30 to cause turning of shaft 30.

Valve 28 and casing section 4 are provided with fluid passages through which fluid is conveyed from the port 14 or 16 to the cells 42 of the gerotor and returned to the other of the ports 14 or 16. Port 14 or 16 will be the inlet, and the other the outlet port, depending on the direction of rotation desired for shaft 30. Valve 28, by reason of the dogbone connection between it and star 18, will rotate at the same speed as the star 18 but in the opposite direction from the orbiting direction of the star 18. Valve 28 has two axially spaced annular channels 64 and 66 which are axially aligned with ports 14 and 16 and in respective fluid communication therewith. With reference to FIGS. 1, 4 and 5, valve 28 has a plurality of axially extending circumferentially arranged and spaced passages which are illustrated herein as a set of eight passages 68 which are in fluid communication through eight radial passages 69 with annular channel 64 and port 14 and a set of eight passages 70, alternately spaced relative to passages 68, which are in fluid communication through eight radial passages 74 with annular channel 66 and port 16. In the fluid pressure device illustrated the passages 68, and the passages 70, are equal in number to the number of teeth 38 on the star 18. Passages 68 and 70 open into recesses in the radial face 32 of valve 28 and such recesses will be referred to in detail further on herein.

Casing section 4 has a plurality of generally axially extending, circumferentially arranged and spaced passages 72 (see FIGS. 1, 2, 3 and 9) illustrated as being nine in number which is equal to the number of teeth 36 of the ring member 6. Passages 72 open into recesses in the radial face 34 of casing section 4 which face slidingly engages the radial face 32 of valve 28. Passages 72 are illustrated herein as being inclined relative to the axis 24 but that is only to accommodate the design of the particular motor shown and passages 72 could be parallel to the axis in other designs.

Upon rotation of valve 28, each of the passages 68 and 70 therein successively registers in fluid communication with each of the passages 72 in casing section 4. Fluid is supplied to and withdrawn from the Gerotor through passages 72 which terminate at points which constitute junctions (see FIG. 2) between the teeth 36 of ring member 6.

Assuming that the fluid pressure device is functioning as a motor, pressurized fluid is introduced through port 14, into annular channel 64, through passages 68 in valve 28, certain of the passages 72 in casing section 4, and certain Gerotor cells 42 which for an instant, as viewed in FIG. 2, are on the left side of the line of eccentricity 44. The expansion of the cells 42 on the left side of the line of eccentricity 44 causes star 18 to gyrate in a clockwise direction and causes collapsing of the cells 42 on the right side of the line of eccentricity 44. Fluid from the collapsing cells 42 flows through casing passages 72 on the right side of the line of eccentricity 44, as viewed in FIG. 2, through all of the valve passages 70, through valve channel 66 and out through port 16. The above description of fluid flow is only for an instantaneous condition in that the line of eccentricity 44 rotates about the axis 24 of ring member 6. As long as pressurized fluid is admitted through port 14, however, the pressurized fluid will always be admitted to cells 42 on the same side of the line of eccentricity 44 and fluid will always be exhausted on the other side of said line.

During orbiting of star 18 about ring member axis 24, the star rotates in the opposite direction about its own axis 40 at a slower speed. The ratio between the orbiting and rotating speeds is dependent upon the ratio between the ring and star member teeth. If that ratio is nine to eight as illustrated herein, the rotating speed of the star will be one-eighth of its orbiting speed. By reason of the dogbone connection between star 18 and valve 28, valve 28 rotates at the same speed and in the same direction as star 18. Valve 28 is a commutating type valve in that it rotates at the same speed that star 18 rotates but it functions to supply and exhaust fluid to and from the Gerotor at the orbiting frequency of the star.

It will be understood from the above description that the rotation of valve 28 causes each one of the group of circumferentially arranged passages 68 and 70 to successively register in axial alignment with the passages 72 in casing section 4. The cross sectional areas of these passages have a bearing on the rate of flow of fluid to and from the Gerotor cells 42 and such areas should be adequate so as to not restrict the flow of fluid to and from the Gerotor to a level below the capacity of the Gerotor.

Considering any cell 42 individually, pressurized fluid is first admitted through a passage 72 to cause the cell to expand subsequently, when the cell collapses, fluid is forced out of the cell through the same passage 72 through which the fluid was admitted to the cell. Referring to the fluid flow rate and time graph shown in FIG. 6, the line 80, which is the same as or similar to a sine curve, indicates the fluid flow rate requirements of a single cell 42 from its fully collapsed stage to its fully expanded stage. The cross sectional areas of the fluid passages 68 and 70 in valve 28 and the fluid flow passages 72 in casing section 4 can be made adequate so that a flow of fluid as indicated by graph line 80 may be supplied to individual cells 42 of the Gerotor and back to port 16, or vice versa, which require special constructions in accordance with the present invention in order to avoid flow restrictions are the fluid communication points between valve passages 68 and 70 on the one hand and casing passages 72 on the other hand. If circular ports are provided in the radial face 32 of valve 28 and in the radial face 43 of casing section 4, the flow characteristics of the circuit are as indicated by the line 82 in the graph of FIG. 6. The reason is that when a port having a circular cross section moves into overlapping relation with a similar port, the overlapping or registering area increases only very gradually at first and, by the time one circular port has moved half way across another circular port, the overlapped area is only about 22 percent of the cross sectional area of either of the passages. Thus the Gerotor fluid flow requirements indicated by line 80 in FIG. 6 would not be met because flow restrictions which would be introduced into the fluid circuit by circular ports in the surfaces 32 and 34 between valve 28 and casing section 4 which would result in flow characteristics in the fluid circuit as represented on the graph by line 82. The Gerotor in a sense would be starved and would not operate at its fullest fluid capacity.

In accordance with the present invention, particular shapes or configurations are provided for the ports in the slidably engaging radial faces 32 and 34 of valve 28 and casing section 4 which function to facilitate the need for the rapid rising and falling of pressures in casing passages 72. At this stage it is pertinent to point out that the word "port" as used herein means the shape or configuration which appears in the plane of a valve face, such as either of the valve faces 32 or 34, where such faces are intersected by fluid passages such as the fluid passages 68, 70 and 72. In accordance with the present invention, shallow recesses are formed in the valve faces 32 and 34 and it is the outline of such a recess in the valve face 32 or 34, each of which is in a two dimensional plane, which constitutes a port in the sense that that term is used herein.

Referring to FIGS. 3, 7 and 9, one embodiment of the invention involves, in part, the providing of recessed ports 86 in the radial face 34 of casing section 4 for passages 72. Ports 86 are symmetrically arranged relative to the axis 24 and each port 86 is symmetrical relative to a radius line in the radial face 34 of casing section 4 which extends from the axis 24 through the axis of the corresponding passage 72 such as the radius line 88 indicated in FIGS. 3 and 7. The sides 90 and 92 of each port 86 are parallel to radius line 88 and are spaced apart a distance equal to the diameter of the passage 72. The exact lengths of sides 90 and 92 are not critical and in practice the ports 86 may be formed with a milling cutter. If the shaft of the milling cutter is perpendicular to the radial face 34, the opposite ends of each port will have rounded ends 94 and 96 by reason of the shape of the milling cutter. The ends of the ports 86 could have other shapes, however, if other means are used for forming the ports 86.

Referring to FIGS. 4, 8 and 9, valve 28 has ports 98 formed in the radial face 32 thereof for passages 68 and 70 which also are of special configuration. The total number of ports 86 and 98 is not important as far as the invention is concerned but in the embodiment illustrated there are nine ports 86 and sixteen ports 98. Ports 98 are generally pie shaped and may be symmetrically arranged relative to the axis 24. Each port 98 is symmetrical relative to a radius line in the radial face 32 of valve 28 which extends from the axis 24 through the axis of a corresponding passage 68 or 70 such as the radius line 100 indicated in FIGS. 4 and 8.

Each port 98 has sides 102 and 104. In practice ports 98 may be separated from each other by any distance which is just slightly greater than the width of a port 86. Theoretically such separation could be equal to the width of a port 86 but, as a practical matter, for sealing purposes and to allow for slight irregularities in the manufacturing process, the separation distance should be at least slightly greater by a few thousandths of an inch.

In the embodiment illustrated there is a manufacturing advantage to be gained if ports 98 are separated by a distance which is approximately equal to the width of a port 86 because in that case adjacent sides of adjacent ports 98 will be parallel to each other. Referring to FIGS. 8 and 9, there is indicated a circle 106 (for illustration purposes only) which has axis 24 for a center and has a diameter which is at least equal to and preferably slightly larger than the width of each of the ports 86. Adjacent sides 102 and 104 of any pair of adjacent ports 98 are determined by making them coincident with a pair of parallel tangent lines such as the lines 108 and 110 which are tangent to the circle 106 and parallel to each other.

In forming the ports 98 a milling operation may be performed wherein two spaced milling cutters on a shaft which is parallel to radial face 32 make a cut to form two recesses having sides defined in FIG. 8 by the letter *a*. The milling cutters then make another cut to form two more recesses having sides defined in FIG. 8 by the letter *b*. At this point it will be noted that one of the ports ports 98 of valve 28 are shown in FIG. 9 superimposed port on each side thereof has been partially formed. This is the manufacturing advantage gained by having sides 102 and 104 of adjacent ports parallel to each other because halves of any two adjacent ports 98 can be formed with only one milling operation as explained.

If a greater spacing for the ports 98 is desired, the tangent lines 108 and 110 may be spread so as to be angularly displaced with respect to each other. The new positions of tangent lines 108 and 110 will determine respectively the positions for sides 104 and 102 of the ports 98.

For purposes of further illustration, the outlines of the ports 98 of valves 28 are shown in FIG. 9 superimposed on the radial face 34 of casing section 6 to show the relationship of ports 98 to ports 86. If valve 28 were rotating clockwise as viewed in FIG. 9, the sides 104 and 102 of each port 98 may be referred to as leading and trailing edges respectively and the sides 90 and 92 of each casing port 86 may be referred to as leading and trailing edges respectively. The respective shapes of ports 98 and 86 are dependent upon and complement each other. By visualizing one port 98 approaching another port 86, overlapping it and passing it, the shape of the ports 98 and 86 may be described. The shape of a port 98 is determined by having a leading edge 104 thereof parallel to a leading edge 90 of a port 86 at the instant prior to any overlapping of the ports and by having a trailing edge 102 of a port 98 parallel to a trailing edge 92 of a port 86 at the instant after there is no overlapping of the ports.

Figure 6:
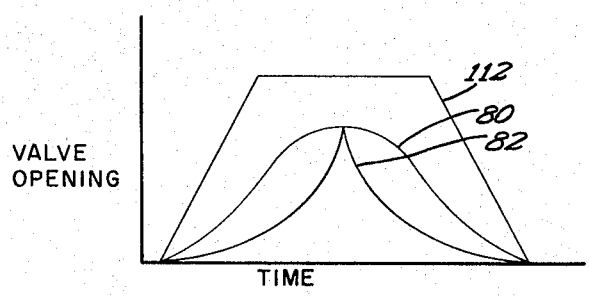
FIG. 6 is a graph which shows the fluid pressure volume rate requirements of the fluid pressure motor or pump illustrated and a comparison between the fluid pressure characteristics of the porting arrangement of the present invention and a conventional porting arrangement.

With the port construction described there is fluid communication across the full radial width of a pair of ports 98 and 86 at the instant after any overlapping occurs and thereafter during the full time that there is overlapping between the ports. With reference to FIG. 6, fluid flow line 112 indicates how this construction permits the flow of fluid to rise and fall rapidly in passages 72 of casing section 4 because of the rapid valve opening and closing between ports 98 and 86 such that the fluid flow requirements of the gerotor cells 42 are exceeded. As there are nine ports 86 and sixteen ports 98 in the illustrated embodiment, the ports 98 at any instant are in various positions with regard to approaching, overlapping and receding from ports 86. With reference to FIG. 9, and assuming ports 98 are moving in a clockwise direction, it will be noted by observing each port 98 that the leading edge 104 thereof is parallel to the leading edge 90 of a port 86 only at the instant prior to overlapping of the ports and that the trailing edge 102 of a port 98 is parallel to a trailing edge 92 of a port 88 only at the instant immediately after overlapping of the ports has been completed.

In the illustrated embodiment of the invention the parallel sides 90 and 92 of a casing port 86 dictates that the valve port 98 should have the generally trapezoidal shape or pie shape shown in FIGS. 4, 8 and 9.

While one embodiment of the invention is described here, it will be understood that it is capable of modifica-

What I claim is:

1. A valve comprising first and second members which are relatively rotatable about an axis and have first and second surfaces which slidably engage each other in a plane, an imaginary construction circle in said plane having the center thereof coincident with said axis, a first set of circumferentially arranged ports in said first surface having sides which are parallel to each other and tangential to opposite sides of said circle, and a second set of circumferentially arranged ports in said second surface spaced the same radial distance from said axis as said first set of ports, said second set of ports having adjacent sides of adjacent ports which are parallel to each other and tangential to opposite sides of said circle.

2. A valve in accordance with claim 1 wherein said first member has generally axially extending passages in communication with said first set of ports with each of said passages having the same diameter as said circle, said first set of ports being recessed relative to said first surface.

3. A valve in accordance with claim 2 where said second member has generally axially extending passages and said second set of ports are recessed relative to said second surface.

4. A valve in according with claim 1 wherein said first set of ports are registrable successively with said second set of ports during relative movement between said members, with each pair of registering ports having the leading sides thereof parallel immediately prior to any overlapping between the ports and the trailing sides thereof parallel immediately after any overlapping between the ports.

5. A method of making a valve having a plurality of recessed and circumferentially arranged ports wherein adjacent sides of adjacent ports are parallel to each other comprising the step of milling two parallel recesses in one operation to form adjacent portions of two adjacent ports, said milling operation being performed a total number of times equal to the total number of ports to be formed.

References Cited by the Examiner

UNITED STATES PATENTS

| 1,505,707 | 8/1924 | Hill | 74—462 |
| 2,148,561 | 2/1939 | Kempton | 251—208 |
| 2,484,789 | 10/1949 | Hill | 103—120 |
| 2,601,397 | 6/1952 | Hill | 74—462 |
| 2,938,543 | 5/1960 | Johnson | 137—625.21 |

FOREIGN PATENTS

| 896,056 | 5/1962 | Great Britain. |

M. CARY NELSON, *Primary Examiner.*

W. R. CLINE, *Examiner.*